(12) United States Patent
Suzuki et al.

(10) Patent No.: US 11,697,253 B2
(45) Date of Patent: Jul. 11, 2023

(54) IMPREGNATION DEVICE AND SHAPING APPARATUS

(71) Applicant: FUJIFILM BUSINESS INNOVATION CORP., Tokyo (JP)

(72) Inventors: Wataru Suzuki, Kanagawa (JP); Daisuke Nakayama, Kanagawa (JP); Taichi Yamada, Kanagawa (JP); Nobuhiro Katsuta, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 425 days.

(21) Appl. No.: 16/923,333

(22) Filed: Jul. 8, 2020

(65) Prior Publication Data
US 2021/0260838 A1   Aug. 26, 2021

(30) Foreign Application Priority Data

Feb. 21, 2020   (JP) .................................. 2020-028649

(51) Int. Cl.
| | | |
|---|---|---|
| *B29C 70/50* | (2006.01) | |
| *B29C 64/118* | (2017.01) | |
| *B29C 70/16* | (2006.01) | |
| *B29C 64/393* | (2017.01) | |
| *B33Y 30/00* | (2015.01) | |

(52) U.S. Cl.
CPC ............ *B29C 70/50* (2013.01); *B29C 64/118* (2017.08); *B29C 64/393* (2017.08); *B29C 70/16* (2013.01); *B33Y 30/00* (2014.12)

(58) Field of Classification Search
CPC ... B29C 64/118; B29C 64/165; B29C 64/209; B29C 70/0035; B29C 70/16; B29C 70/382; B29C 70/50; B29C 64/393
See application file for complete search history.

(56) References Cited

U.S. PATENT DOCUMENTS

| | | | | |
|---|---|---|---|---|
| 5,936,861 A | * | 8/1999 | Jang ....................... | B33Y 30/00 700/98 |
| 6,129,872 A | * | 10/2000 | Jang ....................... | B33Y 50/02 425/162 |
| 2017/0088701 A1 | | 3/2017 | Okoshi et al. | |
| 2019/0202120 A1 | * | 7/2019 | Budge ................... | B33Y 50/02 |

FOREIGN PATENT DOCUMENTS

| | | |
|---|---|---|
| JP | H06-254857 A | 9/1994 |
| JP | 2017-061638 A | 3/2017 |

* cited by examiner

*Primary Examiner* — James Sanders
(74) *Attorney, Agent, or Firm* — Oliff PLC

(57) ABSTRACT

An impregnation device includes an impregnation unit, a first supply unit, a second supply unit, and a supply controller. The impregnation unit impregnates a bundle of transported continuous fibers with a resin mixture. The first supply unit supplies a resin of a first composition to the impregnation unit. The second supply unit supplies a resin of a second composition that is different from the resin of the first composition to the impregnation unit. The supply controller controls an amount of resin supplied from the first supply unit and the second supply unit to the impregnation unit.

18 Claims, 5 Drawing Sheets

IMPREGNATION DEVICE AND SHAPING APPARATUS

CROSS-REFERENCE TO RELATED APPLICATIONS

This application is based on and claims priority under 35 USC 119 from Japanese Patent Application No. 2020-028649 filed Feb. 21, 2020.

BACKGROUND

1. Technical Field

The present disclosure relates to an impregnation device and a shaping apparatus.

2. Related Art

JP-A-6-254857 describes a method of manufacturing a fiber-reinforced thermoplastic resin composition containing fibers having a long fiber length by coating (impregnating) a bundle of continuous reinforcing fibers with a molten thermoplastic resin, the method including: pressing a bundle of continuous fibers passing through a die to open the bundle by plural rotatable rollers provided in a die box and having surfaces close to each other; and simultaneously injecting a molten resin from plural resin injection ports provided in the die box to continuously coat (impregnate) the opened bundle of reinforcing fibers with the resin.

SUMMARY

Aspects of non-limiting embodiments of the present disclosure relate to an impregnation device in which a resin composition in an impregnation unit is easily adjusted, as compared with a configuration in which each of plural supply units supplies a resin having the same composition to the impregnation unit.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an impregnation device including an impregnation unit, a first supply unit, a second supply unit, and a supply controller. The impregnation unit impregnates a bundle of transported continuous fibers with a resin mixture. The first supply unit supplies a resin of a first composition to the impregnation unit. The second supply unit supplies a resin of a second composition that is different from the resin of the first composition to the impregnation unit. The supply controller controls an amount of resin supplied from the first supply unit and the second supply unit to the impregnation unit.

BRIEF DESCRIPTION OF THE DRAWINGS

Exemplary embodiments of the present disclosure will be described in detail based on the following figures, wherein.

DETAILED DESCRIPTION

First Exemplary Embodiment

Figure 1:
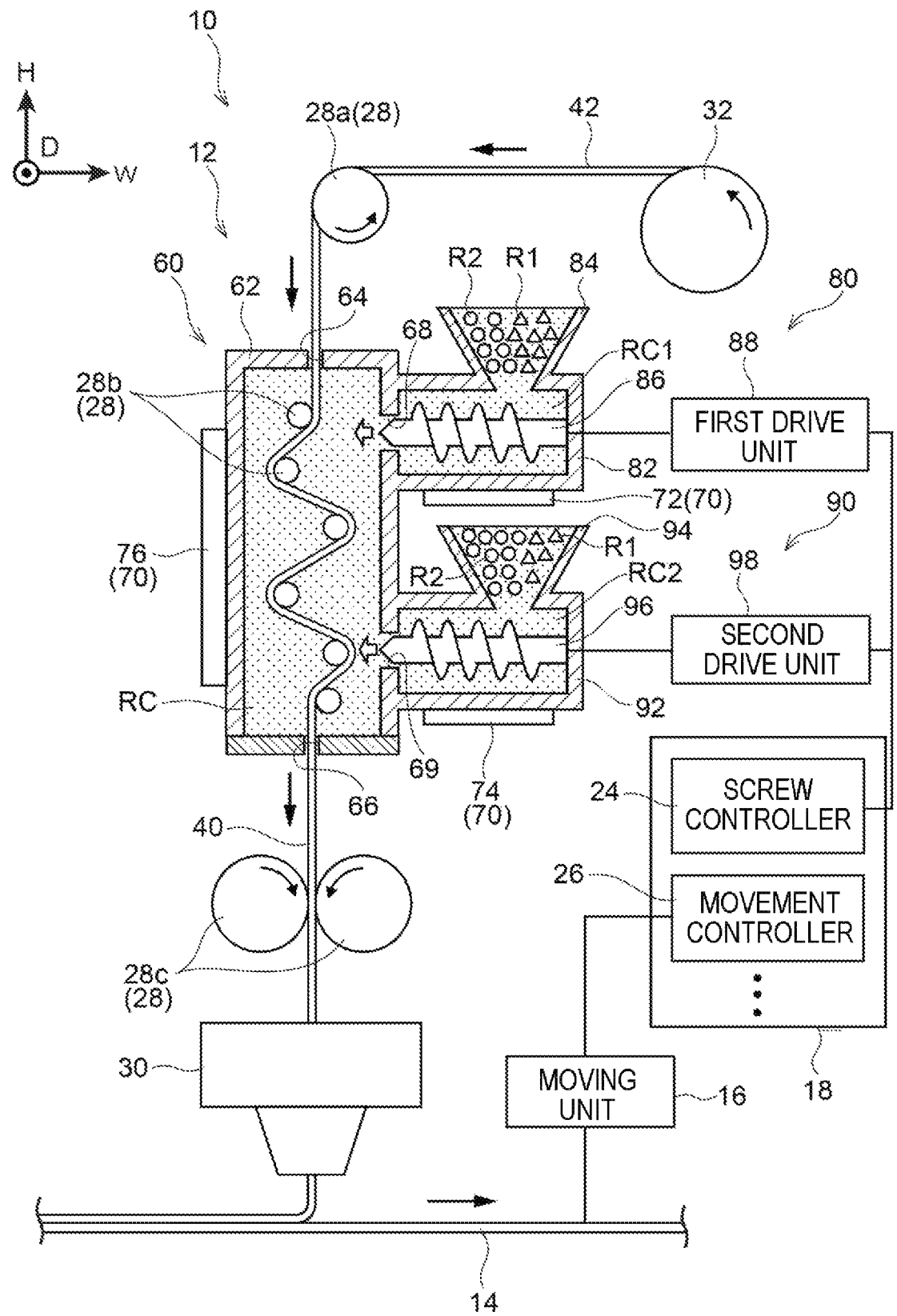
FIG. 1 is a schematic configuration diagram illustrating a shaping apparatus according to a first exemplary embodiment.

First, an example of an impregnation device and a shaping apparatus according to a first exemplary embodiment of the present disclosure will be described based on FIGS. 1 and 2. In addition, an arrow H illustrated in the drawings indicates the apparatus vertical direction (vertical direction), an arrow W indicates the apparatus width direction (horizontal direction), and an arrow D indicates the apparatus depth direction (horizontal direction).

(Shaping Apparatus 10)

The shaping apparatus 10 is a three-dimensional shaping apparatus (3D printer) of fused deposition modeling (FDM). The shaping apparatus 10 shapes a three-dimensional object by stacking plural layers according to layer data of plural layers.

As illustrated in FIG. 1, the shaping apparatus 10 includes a shaping unit 12, a base unit 14, a moving unit 16, and a controller 18. The shaping unit 12 ejects downward a filament 40, which will be described later, as a shaping material. The base unit 14 is disposed below the shaping unit 12 and has a horizontal surface that faces upward. The moving unit 16 moves the shaping unit 12 relative to the base unit 14. The moving unit 16 is electrically connected to the moving unit 16 and includes a movement controller 26 that controls the operation thereof. In the first exemplary embodiment, the moving unit 16 includes an actuator that moves the base unit 14 in the apparatus vertical direction, the apparatus width direction, and the apparatus depth direction. Further, the moving unit 16 may be an actuator that moves the shaping unit 12.

The shaping unit 12 includes a reel 32, a transport unit 28, an impregnation device 60, and an ejection unit 30. A fiber bundle 42 is wound around the reel 32. The fiber bundle 42 is a bundle of plural continuous fibers without being twisted together. The fiber bundle 42 is an example of a bundle of continuous fibers. The continuous fiber is, for example, a carbon fiber having a diameter of 0.007 mm. The fiber bundle 42 is formed by bundling, for example, 3,000 carbon fibers in a circular shape having a diameter of 0.4 mm. The transport unit 28 transports the fiber bundle 42 wound on the reel 32 to the impregnation device 60, and transports the filament 40 formed of the fiber bundle 42 in the impregnation device 60 to the ejection unit 30. The impregnation device 60 forms the filament 40 by impregnating the fiber bundle 42 transported from the reel 32 with a resin mixture RC (to be described later), and sends the filament 40 toward the ejection unit 30. The ejection unit 30 ejects the filament 40 sent out from the impregnation device 60 downward to the base unit 14. The details of the impregnation device 60 will be described later. In addition, in the exemplary embodiment, the reel 32 is configured to be detachable from the shaping apparatus 10 and replaceable with another reel.

The transport unit 28 includes a guide roller 28a, an impregnation roller group 28b, a transport roller pair 28c, and a transport controller 20.

The guide roller 28a is a roller member arranged between the reel 32 and the impregnation device 60. A fiber bundle 42 extending from the reel 32 is wound around the guide roller 28a, and the fiber bundle 42 is guided to a receiving port 64 of the impregnation device 60 (to be described later).

The impregnation roller group 28b refers to plural roller members that are arranged in a zigzag shape extending in the transport direction of the fiber bundle 42 inside an impregnation unit 62 of the impregnation device 60 (to be described later). The impregnation roller group 28b opens the fiber bundle 42 that is transported in the impregnation unit 62 from the receiving port 64 toward a delivery port 66 side (to be described later) along with the transport, and facilitates impregnation of the fiber bundle 42 with the resin mixture RC. Further, the impregnation roller group 28b forms the filament 40 by converging the fiber bundle 42 impregnated with the resin mixture RC in the opened state along with the transport, and then guides the filament 40 to the delivery port 66.

The transport roller pair 28c is a pair of roller members arranged between the ejection unit 30 and the impregnation device 60. The transport roller pair 28c is connected to a drive unit (not illustrated) and rotates. The transport roller pair 28c transports the filament 40 toward the ejection unit 30 by sandwiching and rotating the filament 40 transported from the delivery port 66 of the impregnation device 60. The transport controller 20 is electrically connected to a drive unit (not illustrated) connected to the transport roller pair 28c and controls the operation thereof.

Figure 2:
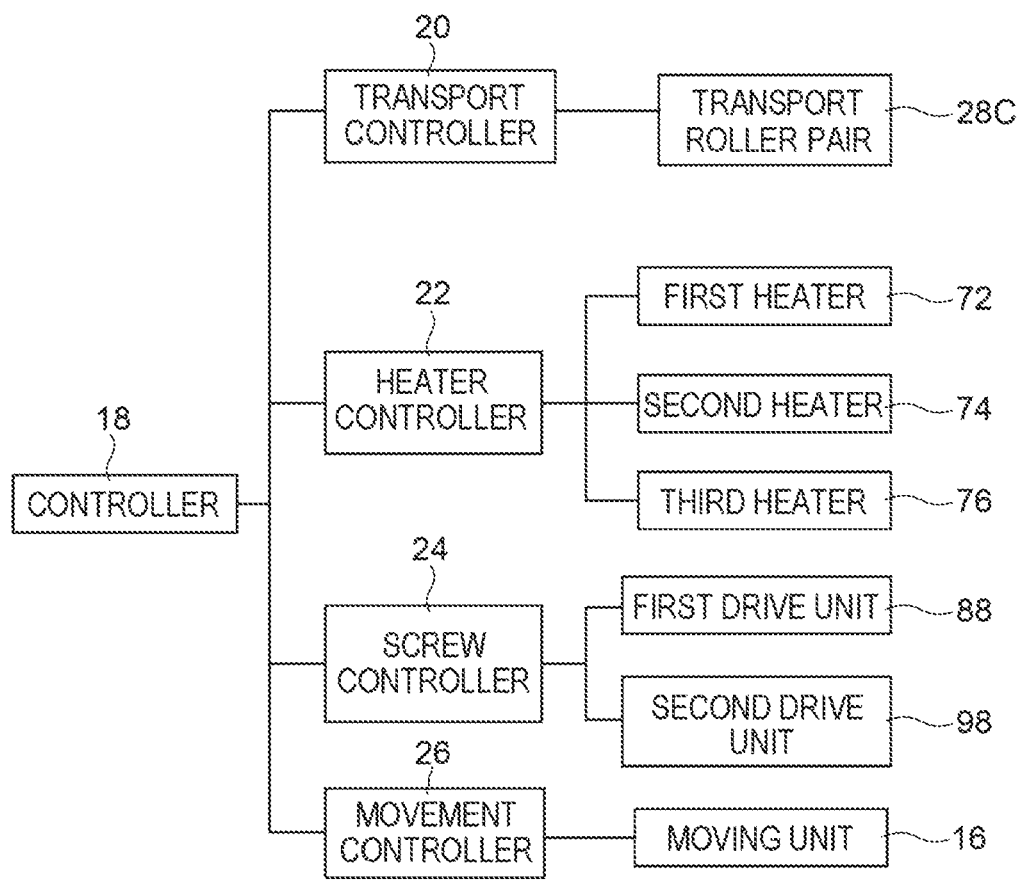
FIG. 2 is a block diagram illustrating a control system of the shaping apparatus according to the first exemplary embodiment.

As illustrated in FIG. 2, the controller 18 is electrically connected to the transport controller 20, the movement controller 26, and a heater controller 22 and a screw controller 24 of the impregnation device 60 (to be described later). The controller 18 controls the entire behavior of the shaping apparatus 10 through the transport controller 20, the movement controller 26, the heater controller 22, and the screw controller 24 according to plural layer data created as the three-dimensional data of the three-dimensional object.
(Impregnation Device 60)

As illustrated in FIG. 1, the impregnation device 60 includes the impregnation unit 62, a heater unit 70, a first supply unit 80, a second supply unit 90, and the screw controller 24. The details of the screw controller 24 will be described later.
(Impregnation Unit 62)

The impregnation unit 62 is, for example, a container extending in the transport direction of the fiber bundle 42. Specifically, the impregnation unit 62 includes a pair of end walls that intersects with the transport direction of the fiber bundle 42, and a side wall that extends in the transport direction of the fiber bundle 42 and connects the peripheral portions of the pair of end walls. The impregnation roller group 28b is arranged inside the impregnation unit 62, as described above. Further, the resin mixture RC that is in a molten state by a third heater 76 of the heater unit 70 (to be described later) is accommodated inside the impregnation unit 62. The impregnation unit 62 includes the receiving port 64, the delivery port 66, a first supply port 68, and a second supply port 69.

The receiving port 64 is an opening that is formed in the upstream end wall of the impregnation unit 62 in the transport direction of the fiber bundle 42. The receiving port 64 accommodates the fiber bundle 42 guided and transported by the guide roller 28a inside the impregnation unit 62. The delivery port 66 is an opening that is formed on the downstream end wall of the impregnation unit 62 in the transport direction of the fiber bundle 42. The delivery port 66 sends the filament 40 transported along the impregnation roller group 28b to the outside of the impregnation unit 62.

The first supply port 68 and the second supply port 69 are two openings that are formed on the side wall of the impregnation unit 62 and are arranged side by side in the transport direction of the fiber bundle 42. Of the two openings, the upstream opening in the transport direction of the fiber bundle 42 is the first supply port 68, and the downstream opening in the transport direction of the fiber bundle 42 is the second supply port 69. The first supply port 68 and the second supply port 69 are respectively connected to a first supply unit 80 and a second supply unit 90 (to be described later).

As described above, the fiber bundle 42 is impregnated with the resin mixture RC inside the impregnation unit 62, whereby the filament 40 is generated and sent from the delivery port 66 to the outside of the impregnation unit 62. The resin mixture RC accommodated in the impregnation unit 62 is consumed with the generation of the filament 40. At this time, a resin RC1 of a first composition and a resin RC2 of a second composition accommodated in the first supply unit 80 and the second supply unit 90, respectively, are supplied inside the impregnation unit 62 through the first supply port 68 and the second supply port 69. In other words, the resin mixture RC consumed by the generation of the filament 40 is supplied to the impregnation unit 62 by the first supply unit 80 and the second supply unit 90. The details of the resin RC1 of the first composition and the resin RC2 of the second composition will be described later.
(Heater Unit)

The heater unit 70 includes a first heater 72, a second heater 74, the third heater 76, and the heater controller 22. The first heater 72 and the second heater 74 are arranged in body portions 82 and 92 of the first supply unit 80 and the second supply unit 90 (to be described later), respectively. The third heater 76 is arranged on the side wall of the impregnation unit 62. The first heater 72, the second heater 74, and the third heater 76 heat and melt the resin contained inside the first supply unit 80, the second supply unit 90, and the impregnation unit 62, respectively. The first heater 72, the second heater 74, and the third heater 76 heat the resin, for example, within a range of 200° C. or higher and 250° C. or lower. The heater controller 22 is electrically connected to the first heater 72, the second heater 74, and the third heater 76, and controls the respective operations.
(First Supply Unit)

The first supply unit 80 includes a body 82, a first hopper 84, a first supply screw 86, and a first drive unit 88.

The body 82 is, for example, a cylindrical container extending in a direction intersecting the transport direction of the fiber bundle 42. The end wall on one side in the longitudinal direction of the body 82 is connected to the impregnation unit 62 at the first supply port 68. In addition, a supply port 82a connected to the first hopper 84 is formed on the upper peripheral wall of the body 82. The resin RC1 of the first composition which is heated by the first heater 72 and is in a molten state is accommodated inside the body 82.

The first hopper 84 is a member that has a funnel shape extending downward and is connected to the body 82 at the supply port 82a. A resin R1 of a first component and a resin R2 of a second component, which will be described later, are accommodated in the form of pellets mixed in a mass ratio of, for example, 6 to 4 inside the first hopper 84. When the resin RC1 of the first composition accommodated in the first supply unit 80 is supplied to the impregnation unit 62, the first hopper 84 supplies the pellet-shaped resin R1 of the first component and the resin R2 of the second component, which are accommodated inside the first hopper 84, to the inside of the body 82 from the supply port 82a. The pellet-shaped resin R1 of the first component and the resin R2 of the second component supplied inside the body 82 are melted by the heating of the first heater 72 and become the resin RC1 of the first composition.

The first supply screw 86 is a screw member that is arranged inside the body 82 and extends in the longitudinal direction of the body 82. An end of the first supply screw 86 opposite to the first supply port 68 is rotatably supported by an end portion of the body 82 opposite to the first supply port 68. The first supply screw 86 is connected to the first drive unit 88. The first drive unit 88 includes, for example, a motor. The first supply screw 86 is rotated by the first drive unit 88 to agitate the resin RC1 of the first composition in a molten state accommodated inside the body 82, and supply the resin RC1 of the first composition from the first supply port 68 to the inside of the impregnation unit 62. The supply amount of the resin RC1 of the first composition supplied from the first supply port 68 to the inside of the impregnation unit 62 changes depending on the number of rotations of the first supply screw 86 and the first drive unit 88. That is, the first supply screw 86 and the first drive unit 88 change the supply amount of the resin RC1 of the first composition from the first supply unit 80 to the impregnation unit 62. The first supply screw 86 and the first drive unit 88 are examples of a first variable unit.

(Second Supply Unit)

The second supply unit 90 includes a body 92, a second hopper 94, a second supply screw 96, and a second drive unit 98. The second supply unit 90 has the same configuration as the first supply unit 80 except that the body 92 is connected to the impregnation unit 62 at the second supply port 69, and the composition of the resin accommodated inside the body 92 and the second hopper 94 is different from that of the first supply unit 80. Specifically, the body 92 of the second supply unit 90, the second hopper 94, the second supply screw 96, and the second drive unit 98 correspond to the body 82 of the first supply unit 80, the first hopper 84, the first supply screw 86, and the first drive unit 88, respectively. That is, the second supply screw 96 and the second drive unit 98 change the supply amount of the resin RC2 of the second composition from the second supply unit 90 to the impregnation unit 62. The second supply screw 96 and the second drive unit 98 are examples of a second variable unit. Further, the resin RC2 of the second composition is accommodated inside the body 92. In addition, inside the second hopper 94, the pellet-shaped resin R1 of the first component and the resin R2 of the second component are accommodated in a state of being mixed in a mass ratio of, for example, 3 to 7. Further, the pellet-shaped resin R1 of the first component and the resin R2 of the second component supplied inside the body 92 are melted by the heating of the second heater 74 to become the resin RC2 of the second composition.

Further, the first supply unit 80 and the second supply unit 90 supply the resin to the impregnation unit 62 at different positions in the transport direction of the fiber bundle 42. Also, the second supply unit 90 supplies the resin RC2 of the second composition to the impregnation unit 62 downstream of the first supply unit 80 in the transport direction of the fiber bundle 42.

(Resin Mixture)

A resin mixture RC accommodated in the impregnation unit 62 is a resin obtained by mixing the resin R1 of the first component and the resin R2 of the second component.

(Resin of First Component)

The resin R1 of the first component is made of polyolefins. The polyolefins may be used alone or in combination of two or more.

The polyolefin is a resin containing a repeating unit derived from an olefin, and may contain a repeating unit derived from a monomer other than the olefin as long as the polyolefin is 30% by mass or less based on the entire resin. The polyolefin is obtained by addition polymerization of an olefin (a monomer other than the olefin, if necessary). Further, the olefin and the monomer other than the olefin for obtaining the polyolefin may be one type or two or more types.

The polyolefin may be a copolymer or a homopolymer. Further, the polyolefin may be linear or branched.

Here, examples of the olefin include linear or branched aliphatic olefins and alicyclic olefins. Examples of the aliphatic olefins include α-olefins such as ethylene, propylene, 1-butene, 1-hexene, 4-methyl-1-pentene, 1-octene, 1-decene, 1-hexadecene, and 1-octadecene. Examples of the alicyclic olefins include cyclopentene, cycloheptene, norbornene, 5-methyl-2-norbornene, tetracyclododecene, and vinylcyclohexane. Among such examples, α-olefins are preferable, ethylene and propylene are more preferable, and propylene is particularly preferable, from the viewpoint of cost.

Further, the monomer other than the olefin is selected from known addition-polymerizable compounds. Examples of the addition-polymerizable compounds include styrenes such as styrene, methyl styrene, α-methyl styrene, β-methyl styrene, t-butyl styrene, chlorostyrene, chloromethyl styrene, methoxystyrene, styrenesulfonic acid, and salts thereof; (meth)acrylic acid esters such as alkyl (meth)acrylate, benzyl (meth)acrylate, and dimethylaminoethyl (meth)acrylate; halovinyls such as vinyl chloride; vinyl esters such as vinyl acetate and vinyl propionate; vinyl ethers such as vinyl methyl ether; vinylidene halides such as vinylidene chloride; and N-vinyl compounds such as N-vinylpyrrolidone.

Examples of suitable polyolefins include polypropylene (PP), polyethylene (PE), polybutene, polyisobutylene, coumarone/indene resin, terpene resin, and ethylene/vinyl acetate copolymer resin (EVA). Among such examples, the polyolefin is preferably a resin containing only a repeating unit derived from olefin, and polypropylene is particularly preferable from the viewpoint of cost.

The molecular weight of the polyolefin is not particularly limited, and may be determined according to the type of resin, the molding conditions, and the intended use of the obtained three-dimensional structure. The weight average molecular weight (Mw) of the polyolefin is, for example, preferably 10,000 or more and 300,000 or less, and more preferably 10,000 or more and 200,000 or less.

The weight average molecular weight (Mw) of the polyolefin is measured by the gel permeation chromatography (GPC) under the following conditions. A high temperature GPC system "HLC-8321GPC/HT" is used as a GPC device, and o-dichlorobenzene is used as an eluent. The polyolefin is once melted and filtered in o-dichlorobenzene at a high temperature (a temperature of 140° C. or higher and 150° C. or lower), and the filtrate is used as a measurement sample. As the measurement conditions, a sample concentration of 0.5%, a flow rate of 0.6 ml/min, a sample injection amount of 10 μl, and an RI detector are used. In addition, the calibration curve is created from 10 samples of "polystyrene standard sample TSK standard" manufactured by Tosoh Corporation: "A-500," "F-1," "F-10," "F-80," "F-380," "A-2500," "F-4," "F-40," "F-128," and "F-700."

Further, a glass transition temperature (Tg) or melting temperature (Tm) of the polyolefin is not particularly limited, like the above-mentioned molecular weight, and may be determined according to the type of resin, molding conditions, and use of the obtained three-dimensional structure. For example, the melting temperature (Tm) of the polyolefin is preferably 100° C. or higher and 300° C. or lower, and more preferably 150° C. or higher and 250° C. or lower. The melting temperature (Tm) of the polyolefin is obtained by a known method for measuring the melting temperature of the resin.

(Resin of Second Component)

The resin R2 of the second component contains a high-affinity resin RS and a compatibilizer RY.

(High-Affinity Resin)

The high-affinity resin RS is a resin having a higher affinity for the continuous fibers of the fiber bundle 42 than the resin R1 of the first component. The high-affinity resin RS is selected from the group consisting of, for example, a resin containing at least one of an amide bond or an imide bond (hereinafter, referred to as a specific resin a), a resin containing an ester bond (hereinafter, referred to as a specific resin b), or a resin having a binding group containing sulfur (hereinafter, referred to as a specific resin c). The high-affinity resin RS may be used alone or in combination of two or more.

—Specific Resin a—

The specific resin a contains at least one of an imide bond or an amide bond in the molecule. By containing an imide bond or an amide bond, affinity is exhibited with the polar group existing on the surface of the fiber (for example, carbon fiber). Therefore, when a part of the specific resin a covers at least a part of the fiber surface, the adhesion between the fiber and the specific resin a may increase.

Specific examples of the specific resin a include polyamides (PA), polyimides (PI), polyamideimides (PAI), polyetherimides (PEI), and polyamino acids.

As the specific resin a, it is preferable that the specific resin a has low compatibility with the resin R1 of the first component (that is, polyolefin) and has a different SP value from the resin R1 of the first component (that is, polyolefin). Among them, polyamide (PA) is preferable as the specific resin a from the viewpoints of being able to be molded at low temperatures, further improving the flexural modulus, and being excellent in adhesion to fibers.

Examples of polyamides include polyamides obtained by copolycondensation of dicarboxylic acid and diamine, and polyamides obtained by condensation of lactam. That is, examples of the polyamides include a polyamide having at least one of a structural unit in which a dicarboxylic acid and a diamine are polycondensed or a structural unit in which a lactam is ring-opened.

Examples of dicarboxylic acid include oxalic acid, adipic acid, suberic acid, sebacic acid, terephthalic acid, isophthalic acid, 1,4-cyclohexanedicarboxylic acid, malonic acid, succinic acid, glutaric acid, pimelic acid, azelaic acid, and phthalic acid, and adipic acid, and terephthalic acid are preferable among such examples. Examples of the diamine include ethylenediamine, pentamethylenediamine, hexamethylenediamine, nonanediamine, decamethylenediamine, 1,4-cyclohexanediamine, p-phenylenediamine, m-phenylenediamine, and m-xylenediamine, and hexamethylenediamines are preferable among such examples. Examples of the lactam include ε-caprolactam, undecane lactam, and lauryl lactam, and ε-caprolactam is preferable among such examples.

The above dicarboxylic acid, diamine, and lactam may be used alone or in combination of two or more.

The polyamide may be an aromatic polyamide or an aliphatic polyamide.

Examples of the aromatic polyamides include MXD6 (condensation polymer of adipic acid and metaxylenediamine; melting point of 237° C.), nylon 6T (condensation polymer of terephthalic acid and hexamethylenediamine; melting point of 310° C.), and nylon 9T (polycondensate of terephthalic acid and nonanediamine; melting point of 306° C.). Examples of commercially available aromatic polyamides include "MXD6" manufactured by Mitsubishi Gas Chemical Co., Inc., "GENESTAR (registered trademark): PA6T" manufactured by Kuraray Co., Ltd., "GENESTAR (registered trademark): PA8T" manufactured by Kuraray Co., Ltd., and "TY-502NZ: PA6T" manufactured by Toyobo Co., Ltd.

Examples of the aliphatic polyamides include nylon 6 (ε-caprolactam ring-opening polycondensate; melting point of 225° C.), nylon 11 (undecane lactam ring-opening polycondensate; melting point of 185° C.), nylon 12 (lauryl lactam ring-opening polycondensate; melting point of 175° C.), nylon 66 (condensation polymer of adipic acid and hexamethylenediamine; melting point of 260° C.), nylon 610 (condensation polymer of sebacic acid and hexamethylenediamine; melting point of 225° C.), and nylon 612 (condensation polymer of caprolactam (6 carbon atoms) and lauryl lactam (12 carbon atoms): melting point of 220° C.). Examples of commercially available aliphatic polyamides include "Zitel (registered trademark): 7331) (PA6)" manufactured by Dupont, and "Zitel (registered trademark): 101L (PA66)" manufactured by Dupont.

When the resin R1 of the first component is polypropylene, it is preferable that the polyamide includes at least one selected from the group consisting of MXD6, nylon 6, and nylon 12 among these polyamides. Further, when the resin R1 of the first component is polyethylene, nylon 12, nylon 11, and MXD6 are preferable as the polyamide.

When the specific resin a is polyamide, the glass transition temperature or melting point of the specific resin a is, for example, preferably in the range of 100° C. or higher and 400° C. or lower, more preferably in the range of 150° C. or higher and 350° C. or lower, further preferably in the range of 150° C. or higher and 250° C. or lower, and most preferably in the range of 160° C. or higher and 240° C. or lower.

—Specific Resin b—

The specific resin b contains an ester bond in the molecule. Since the specific resin b contains an ester bond, affinity is exhibited with the polar group existing on the surface of the fiber (for example, carbon fiber). Therefore, when a part of the specific resin b covers at least a part of the fiber surface, the adhesion between the fiber and the specific resin b may increase.

The specific resin b is not particularly limited as long as it has an ester bond in the molecule. Specific types of the specific resin b include thermoplastic resins having an ester bond in the main chain, and specific examples thereof include polyester and polycarbonate. As the specific resin b, polyester is preferable. The polyester may be either an aliphatic polyester or an aromatic polyester. Examples of the polyester include a polycondensation product of a polyhydric alcohol and a polycarboxylic acid. The polyester may be a commercially available product or a synthesized product. The specific resin b may be used alone or in combination of two or more.

Examples of polycarboxylic acids include aliphatic dicarboxylic acids (for example, oxalic acid, malonic acid, maleic acid, fumaric acid, citraconic acid, itaconic acid, glutaconic acid, succinic acid, alkenylsuccinic acid, adipic acid, and sebacic acid), alicyclic dicarboxylic acids (for example, cyclohexanedicarboxylic acid), aromatic dicarboxylic acids (for example, terephthalic acid, isophthalic acid, phthalic acid, and naphthalenedicarboxylic acid), anhydrides thereof, or lower alkyl groups thereof (having, for example, 1 to 5 carbon atoms). As the polyvalent carboxylic acid, for example, an aromatic dicarboxylic acid is preferable among such examples. As the polycarboxylic acid, a tricarboxylic or higher carboxylic acid having a crosslinked structure or a branched structure may be used in combination with the dicarboxylic acid. Examples of the trivalent or higher carboxylic acid include trimellitic acid, pyromellitic acid, anhydrides thereof, and lower alkyl ester thereof (having, for example, 1 to 5 carbon atoms). The polycarboxylic acids may be used alone or in combination of two or more.

Examples of the polyhydric alcohol include aliphatic diols (for example, ethylene glycol, diethylene glycol, triethylene glycol, propylene glycol, butanediol, hexanediol, and neopentyl glycol), alicyclic diols (for example, cyclohexanediol, cyclohexanedimethanol, and hydrogenated bisphenol A), and aromatic diols (for example, bisphenol A ethylene oxide adduct and bisphenol A propylene oxide adduct). Among such examples, as the polyhydric alcohol, for example, aromatic diols and alicyclic diols are preferable, and aromatic diols are more preferable. As the polyhydric alcohol, a trihydric or higher polyhydric alcohol having a crosslinked structure or a branched structure may be used together with the diol. Examples of the trihydric or higher polyhydric alcohol include glycerin, trimethylolpropane, and pentaerythritol. The polyhydric alcohols may be used alone or in combination of two or more.

Polyester may be obtained by a well-known manufacturing method. Specifically, for example, polyester may be obtained by a method in which the polymerization temperature is set to 180° C. or higher and 230° C. or lower, the pressure in the reaction system is reduced as necessary, and the reaction is performed while removing water and alcohol generated during condensation. Further, when the raw material monomers are insoluble or incompatible at the reaction temperature, a solvent having a high boiling point may be added as a solubilizing agent and dissolved. In this case, the polycondensation reaction is carried out while distilling the solubilizing agent. When there is a poorly compatible monomer, it is advisable to first condense a poorly compatible monomer and the acid or alcohol to be polycondensed with the monomer, and then polycondensate with the main component.

Specific examples of the polyester include polyethylene terephthalate (PET) and polybutylene terephthalate (PBT). Among these, polybutylene terephthalate (PBT) is preferable. Examples of commercially available polyesters include "Novaduran 5010R3-2" (polybutylene terephthalate) manufactured by Mitsubishi Engineering Plastics, and "Duranex 2000" (polybutylene terephthalate) manufactured by Polyplastics.

—Specific Resin c—

The specific resin c is a resin having a binding group containing sulfur. In the present exemplary embodiment, the resin having a binding group containing sulfur refers to a resin having a binding group containing sulfur in its main chain. By including a binding group containing sulfur in the main chain, affinity is exhibited with the polar group existing on the surface of the fiber (for example, carbon fiber). Therefore, when a part of the specific resin c may cover at least a part of the fiber surface, the adhesion between the fiber and the specific resin c may increase.

The specific resin c is not particularly limited as long as it has a binding group containing sulfur in the main chain. Specific examples of the specific resin c include a thermoplastic resin having a connecting group of sulfur and connected by sulfur, and a thermoplastic resin having a sulfonyl bond in the main chain. Specifically, polyphenylene sulfide, polysulfone, polyether sulfone, and polyphenylsulfone may be used. The specific resin c may be obtained by a known manufacturing method. As the specific resin c, a commercially available product or a synthesized product may be used. The specific resin c may be used alone or in combination of two or more.

Examples of commercially available products of the specific resin c include "FZ-2100" (polyphenylene sulfide) manufactured by DIC Corporation and "Sumika Excel 3600G" (polyether sulfone) manufactured by Sumitomo Chemical Co., Ltd.

The glass transition temperature or melting point of the specific resin b and the specific resin c is, for example, preferably in the range of 100° C. or higher and 400° C. or lower, more preferably in the range of 150° C. or higher and 350° C. or lower, further preferably in the range of 150° C. or higher and 250° C. or lower, and most preferably in the range of 160° C. or higher and 240° C. or lower.

(Compatibilizer)

A compatibilizer RY is a resin that enhances the affinity between the resin R1 of the first component and the high-affinity resin RS. The compatibilizer is preferably a resin that has the same partial structure as the resin R1 of the first component and has a partial structure having an affinity for the high-affinity resin RS.

For example, a modified polyolefin is preferably used as the compatibilizer which is a resin having the same partial structure as the resin R1 of the first component and having a partial structure having an affinity for the high-affinity resin RS.

Further, when the resin R1 of the first component is polypropylene (PP), the modified polyolefin is preferably modified polypropylene (PP). Similarly, when the resin R1 of the first component is an ethylene/vinyl acetate copolymer resin (EVA), the modified polyolefin is preferably a modified ethylene/vinyl acetate copolymer resin (EVA).

(Modified Polyolefin)

A modified polyolefin suitable as a compatibilizer is preferably at least one that is selected from the group consisting of a polyolefin having a modified side chain (hereinafter, also referred to as a side chain-modified polyolefin) and a polyolefin having a modified main chain end (hereinafter, also referred to as a main chain end-modified polyolefin).

Examples of the polyolefin whose side chain or main chain end is modified include the same one as the polyolefin which is the resin R1 of the first component, and among them, polypropylene is preferable. Here, examples of polypropylene include, in addition to homopolymers of propylene, random polypropylene of propylene and a small amount (for example, 10% by mass or less in polypropylene) of other α-olefins (for example, ethylene), and block polypropylene of propylene and other α-olefins.

—Side Chain-Modified Polyolefin—

The polyolefin having a modified side chain refers to a polyolefin having a modification site introduced into the side chain. Examples of the modification site introduced into the side chain of the polyolefin include a carboxy group, a carboxylic acid anhydride residue, a carboxylic acid ester residue, an imino group, an amino group, and an epoxy group. From the viewpoint of further improving the affinity between the resin R1 of the first component and the high-affinity resin RS (more preferably, the specific resin a), the modification site introduced into the polyolefin preferably contains a carboxylic acid anhydride residue, and particularly preferably contains a maleic anhydride residue.

The side chain-modified polyolefin is obtained by a method of reacting the compound having the above-mentioned modification site with the polyolefin to directly chemically bond the compound and a method of forming a graft chain using the compound having the above-mentioned modification site and combining the graft chain with the polyolefin. Examples of the compound containing the above-mentioned modification site include maleic anhydride, fumaric anhydride, citric anhydride, N-phenylmaleimide, N-cyclohexylmaleimide, glycidyl (meth)acrylate, glycidyl vinylbenzoate, N-[4-(2,3-epoxypropoxy)-3,5-dimethylbenzyl]acrylamide, alkyl (meth)acrylate, and derivatives thereof. Among the side chain-modified polyolefins, side chain-modified polyolefins obtained by reacting maleic anhydride, which is an unsaturated carboxylic acid, with the polyolefins are preferable.

Specific examples of the side chain-modified polyolefin include maleic anhydride-modified polypropylene, maleic anhydride-modified polyethylene, maleic anhydride-modified ethylene/vinyl acetate copolymer resin (EVA), and acid-modified polyolefin such as their adducts or copolymers.

A commercially available product may be used as the side chain-modified polyolefin. Examples of the modified propylene include Yumex (registered trademark) series (100TS, 110TS, 1001, and 1010) manufactured by Sanyo Chemical Industries, Ltd. Examples of the modified polyethylene include Yumex (registered trademark) series (2000) manufactured by Sanyo Kasei Co., Ltd., and Modic (registered trademark) series manufactured by Mitsubishi Chemical Corporation. Examples of the modified ethylene/vinyl acetate copolymer resin (EVA) include MODIC (registered trademark) series manufactured by Mitsubishi Chemical Corporation.

Further, as the compatibilizer when the specific resin b and the specific resin c are used as the high-affinity resins RS, the following commercial products are used. That is, "Clayton FG polymer" manufactured by Clayton Co., which is maleic anhydride-modified SEBS (maleic anhydride-modified styrene-ethylene-butylene-styrene copolymer), and "MODIPER (registered trademark) A4300" manufactured by NOF CORPORATION, which is a graft polymer in which a butyl acrylate-methyl methacrylate copolymer (graft chain) is bonded to the side chain of an ethylene-glycidyl methacrylate copolymer, may be used.

—Main Chain End-Modified Polyolefin—

The polyolefin having a modified main chain end refers to a polyolefin having a modification site introduced into at least one (preferably both) of the main chain end. Examples of the modification site introduced into the main chain end of the polyolefin include a polymer having a polar group. Examples of the polar group possessed by the modification site include a carboxyl group and a metal salt of a carboxyl group (for example, a sodium salt, a potassium salt, and a zinc salt).

More specifically, the main chain end-modified polyolefin is preferably a block polymer having at least one polymer introduced therein that is selected from the group consisting of poly(meth)acrylic acid and a metal salt of poly(meth)acrylic acid on at least one (preferably both) of the main chain ends of the polyolefin. Here, examples of the metal salt of poly(meth)acrylic acid include a sodium salt, a potassium salt, and a zinc salt of poly(meth)acrylic acid, and the sodium salt is preferable among such examples.

Among such examples, a ternary block polymer of poly(meth)acrylic acid-polyolefin-poly(meth)acrylic acid and a ternary block polymer of sodium salt of poly(meth)acrylic acid-polyolefin-sodium salt of poly(meth)acrylic acid are preferable as the main chain end-modified polyolefin. In the above ternary block polymer, the number average molecular weight of the polyolefin is preferably 1,000 or more and 200,000 or less, and more preferably 10,000 or more and 50,000 or less. Further, in the above ternary block polymer, the number average molecular weight of poly(meth)acrylic acid or a sodium salt of poly(meth)acrylic acid is preferably 500 or more and 10,000 or less, and more preferably 1,000 or more and 5,000 or less.

A commercially available product may be used as the main chain end-modified polyolefin. Specific examples of commercially available products include a ternary block copolymer of polyacrylic acid-isotactic polypropylene-polyacrylic acid (Mn: 4000-23000-4000, also referred to as iPP-PAA) manufactured by Sanei Kogyo Co., Ltd., a ternary block copolymer of sodium polyacrylate-isotactic polypropylene-sodium polyacrylate (Mn: 5000-23000-5000, also referred to as iPP-PAA-Na or iPP-PAA/Na), and a ternary block copolymer of polyacrylic acid-random polypropylene-polyacrylic acid (Mn: 2500-17000-2500, also referred to as rPP-PAA).

—Other Components—

The resin R2 of the second component according to the present exemplary embodiment may include other components in addition to the above components. Examples of other components include flame retardants, flame retardant aids, anti-dripping (drip) agents when heated, plasticizers, antioxidants, releasing agents, light resistance agents, weather resistance agents, colorants, pigments, modifiers, antistatic agents, hydrolysis inhibitors, fillers, and well-known additives such as reinforcing agents other than reinforcing fibers (talc, clay, mica, glass flakes, milled glass, glass beads, crystalline silica, alumina, silicon nitride, aluminum nitride, and boron nitride).

(Resin of First Composition)

The resin RC1 of the first composition accommodated in the first supply unit 80 is a resin in which the resin R1 of the first component and the resin R2 of the second component are mixed in a mass ratio of, for example, 6 to 4. That is, the resin RC1 of the first composition contains the resin R1 of the first component and the resin R2 of the second component.

(Resin of Second Composition)

The resin RC2 of the second composition accommodated in the second supply unit 90 is a resin in which the resin R1 of the first component and the resin R2 of the second component are mixed in a mass ratio of, for example, 3 to 7. That is, the resin RC2 of the second composition has a different composition from the resin RC1 of the first composition. Further, the resin RC2 of the second composition contains at least the resin R2 of the second component. The resin RC2 of the second composition has a higher content rate of the resin R2 of the second component than the resin RC1 of the first composition. In addition, the resin RC2 of the second composition contains the resin R1 of the first component and the resin R2 of the second component, and the mixing ratio of the resin R1 of the first component and the resin R2 of the second component is different from the mixing ratio in the resin RC1 of the first composition. That is, the resin RC1 of the first composition and the resin RC2 of the second composition have different mixing ratios of the resin R1 of the first component and the resin R2 of the second component.

(Filaments)

As described above, the filament 40 is formed by impregnating the fiber bundle 42 with the resin mixture RC by the impregnation device 60. That is, the filament 40 includes the fiber bundle 42, and the resin R1 of the first component and the resin R2 of the second component that constitute the resin mixture RC. The filament 40 has a circular cross section with a diameter of, for example, 0.6 mm.

The content of the fiber bundle 42 in the filament 40 is more preferably in the range of 5% by volume to 70% by volume with respect to the total volume of the filament 40.

The content of the resin R1 of the first component in the filament 40 is more preferably in the range of 50% by mass or more and 95% by mass or less with respect to the total mass of the resin impregnated in the filament 40.

The content of the high-affinity resin RS in the filament 40 is in the range of 5% by mass or more and 50% by mass or less with respect to the total mass of the resin impregnated in the filament 40.

The content of the compatibilizer RY in the filament 40 is in the range of 0.1% by mass or more and 10% by mass or less with respect to the total mass of the resin impregnated in the filament 40.

(Screw Controller)

The screw controller 24 includes a storage medium such as a memory in which a supply pattern KP is stored. The supply pattern KP is an example of a predetermined control table. The screw controller 24 is electrically connected to a first drive unit 88 connected to the first supply screw 86 and a second drive unit 98 connected to the second supply screw 96.

The supply pattern KP is a control table for maintaining a composition ratio of the resin mixture RC accommodated inside the impregnation unit 62 within a predetermined allowable range. More specifically, the supply pattern KP is a control table for reducing a difference in the composition ratio between the upstream side and the downstream side of the resin mixture RC accommodated inside the impregnation unit 62 in the transport direction of the fiber bundle 42 inside the impregnation unit 62. In the supply pattern KP, a supply amount of the resin supplied from the first supply unit 80 and the second supply unit 90 to the impregnation unit 62 is set based on the amount of the filament 40 used in the shaping apparatus 10 to shape the three-dimensional object. The supply amount of the resin set in the supply pattern KP is based on the data obtained experimentally. The screw controller 24 controls the operations of the first drive unit 88 and the second drive unit 98 based on the supply pattern KP to control the supply amount of the resin supplied from the first supply unit 80 and the second supply unit 90 to the impregnation unit 62. As a result, the composition ratio of the resin mixture RC accommodated inside the impregnation unit 62 is maintained within the allowable range. The screw controller 24 is an example of a supply controller. For example, when the mass ratio between the resin R1 of the first component and the resin R2 of the second component on the upstream side of the fiber bundle 42 in the impregnation unit 62 in the transport direction is 6 to 4, the allowable range indicates that the mass ratio of the fiber bundle 42 on the downstream side in the transport direction is such that the resin R1 of the first component is 6 and the resin R2 of the second component is 3.5 or more and 4.5 or less.

(Operation/Effect)

Next, the operation of the first exemplary embodiment will be described. In addition, in this description, when describing a comparative form with respect to the exemplary embodiment, and when using the same components as the shaping apparatus 10 of the first exemplary embodiment, the reference numerals and names of the components are used as they are.

The impregnation device 60 according to the first exemplary embodiment has a configuration in which the resin RC2 of the second composition different from that of the resin RC1 of the first composition of the first supply unit 80 is supplied from the second supply unit 90 to the impregnation unit 62 (a first configuration). Therefore, in the impregnation device 60 having the first configuration, the composition of the resin mixture RC in the impregnation unit 62 may be easily adjusted as compared with the configuration in which each of plural supply units supplies the resin having the same composition to the impregnation unit 62.

Further, the impregnation device 60 according to the first exemplary embodiment has a configuration in which the resin RC1 of the first composition contains the resin R1 of the first component and the resin R2 of the second component, and the resin RC2 of the second composition contains at least the resin R2 of the second component (a second configuration). Therefore, in the impregnation device 60 having the second configuration, the content ratio of the resin R2 of the second component in the impregnation unit 62 may be easily adjusted as compared with the configuration in which the resin RC2 of the second composition does not contain the resin R2 of the second component.

In addition, the impregnation device 60 according to the first exemplary embodiment has a configuration in which the first supply unit 80 and the second supply unit 90 supply the resin to the impregnation unit 62 at different positions in the transport direction of the fiber bundle 42 (a third configuration). Therefore, the impregnation device 60 having the third configuration may adjust the composition of the resin mixture RC in the impregnation unit 62 according to a change in the resin composition in the impregnation unit 62 due to the impregnation of the transported fiber bundle 42.

Further, the impregnation device 60 according to the first exemplary embodiment has a configuration in which the second supply unit 90 supplies the resin RC2 of the second composition to the impregnation unit 62 downstream of the first supply unit 80 in the transport direction of the fiber bundle 42 (a fourth configuration). Therefore, in the impregnation device 60 having the fourth configuration, the content rate of the resin RC2 of the second component on the downstream side in the transport direction in the impregnation unit 62 may be easily adjusted as compared with the configuration in which the second supply unit 90 supplies the resin RC2 of the second composition upstream of the first supply unit 80 in the transport direction of the fiber bundle 42.

Further, the impregnation device 60 according to the first exemplary embodiment has a configuration in which the resin RC2 of the second composition contains the resin R1 of the first component and the resin R2 of the second component, and the resin R1 of the first component and the resin R2 of the second component has a different mixing ratio from that of the resin RC1 of the first composition (a sixth composition). Therefore, in the impregnation device 60 having the sixth configuration, an uneven distribution of the resin R2 of the second component supplied into the impregnation unit 62 within the impregnation unit 62 may be prevented as compared with the configuration in which the second supply unit 90 supplies only the resin R2 of the second component to the impregnation unit 62.

In particular, the impregnation device 60 according to the first exemplary embodiment has the fourth configuration and a configuration in which the content rate of the resin R2 of the second component in the resin RC2 of the second composition is higher than that in the resin R1 of the first composition (a fifth configuration). Since the high-affinity resin RS contained in the resin R2 of the second component has a higher affinity for the continuous fibers of the fiber bundle 42 than the resin R1 of the first component, the proportion of the high-affinity resin RS consumed by the impregnation of the fiber bundle 42 with the resin mixture RC is higher than that of the resin R1 of the first component. Therefore, when the resin mixture RC is impregnated in the fiber bundle 42 transported in the impregnation device 60, the content rate of the high-affinity resin RS of the resin mixture RC in the impregnation device 60 on the downstream side of the fiber bundle 42 in the transport direction is more likely to decrease than that on the upstream side of the fiber bundle 42 in the transport direction. At this time, since the impregnation device 60 of the first exemplary embodiment has the fourth configuration and the fifth configuration, it is possible to reduce the difference in composition ratio between the upstream side and the downstream side of the resin mixture RC accommodated inside the impregnation unit 62 in the transport direction of the fiber bundle 42 inside the impregnation unit 62.

Further, the impregnation device 60 according to the first exemplary embodiment has a configuration in which the resin R2 of the second component contains the high-affinity resin RS and a compatibilizer TY (a seventh configuration). Therefore, in the impregnation device 60 having the seventh configuration, the variation in strength of the filament 40 formed by impregnating the fiber bundle 42 with the resin by the impregnation device 60 is reduced as compared with the configuration in which only the high-affinity resin RS is supplied to the impregnation unit 62.

In addition, the impregnation device 60 according to the first exemplary embodiment has a configuration in which the screw controller 24 controls the amount of resin supplied from the first supply unit 80 and the second supply unit 90 to the impregnation unit 62 based on the supply pattern KP (an eighth configuration). Therefore, in the impregnation device 60 having the eighth configuration, it is possible to control adjusting the composition of the resin mixture RC in the impregnation unit 62 with a simpler configuration than the configuration in which the amount of the resin supplied to the impregnation unit 62 is controlled based on a detection result of a detector. Further, the configuration in which the amount of the resin supplied to the impregnation unit 62 is controlled based on the detection result of the detector will be described later as a second exemplary embodiment of the present disclosure.

The impregnation device 60 according to the first exemplary embodiment has a configuration in which the first supply unit 80 includes the first supply screw 86 and the first drive unit 88, and the second supply unit 90 includes the second supply screw 96 and the second drive unit 98 (a ninth configuration). The first supply screw 86 and the first drive unit 88 change the amount of the resin RC1 of the first composition supplied from the first supply unit 80 to the impregnation unit 62. Further, the second supply screw 96 and the second drive unit 98 change the amount of the resin RC2 of the second composition supplied from the second supply unit 90 to the impregnation unit 62. Therefore, in the impregnation device 60 having the ninth configuration, the composition of the resin mixture RC in the impregnation unit 62 may be easily adjusted as compared with the configuration in which the amount of resin supplied from the first supply unit 80 and the second supply unit 90 to the impregnation unit 62 is non-variable.

Further, in the shaping apparatus 10 including the impregnation device 60 having the first configuration, it is possible to prevent variations in the strength of the three-dimensional object shaped by the shaping apparatus 10, as compared with the configuration in which each of plural supply units includes the impregnation device that supplies the resin having the same composition to the impregnation unit 62.

Second Exemplary Embodiment

Figure 4:
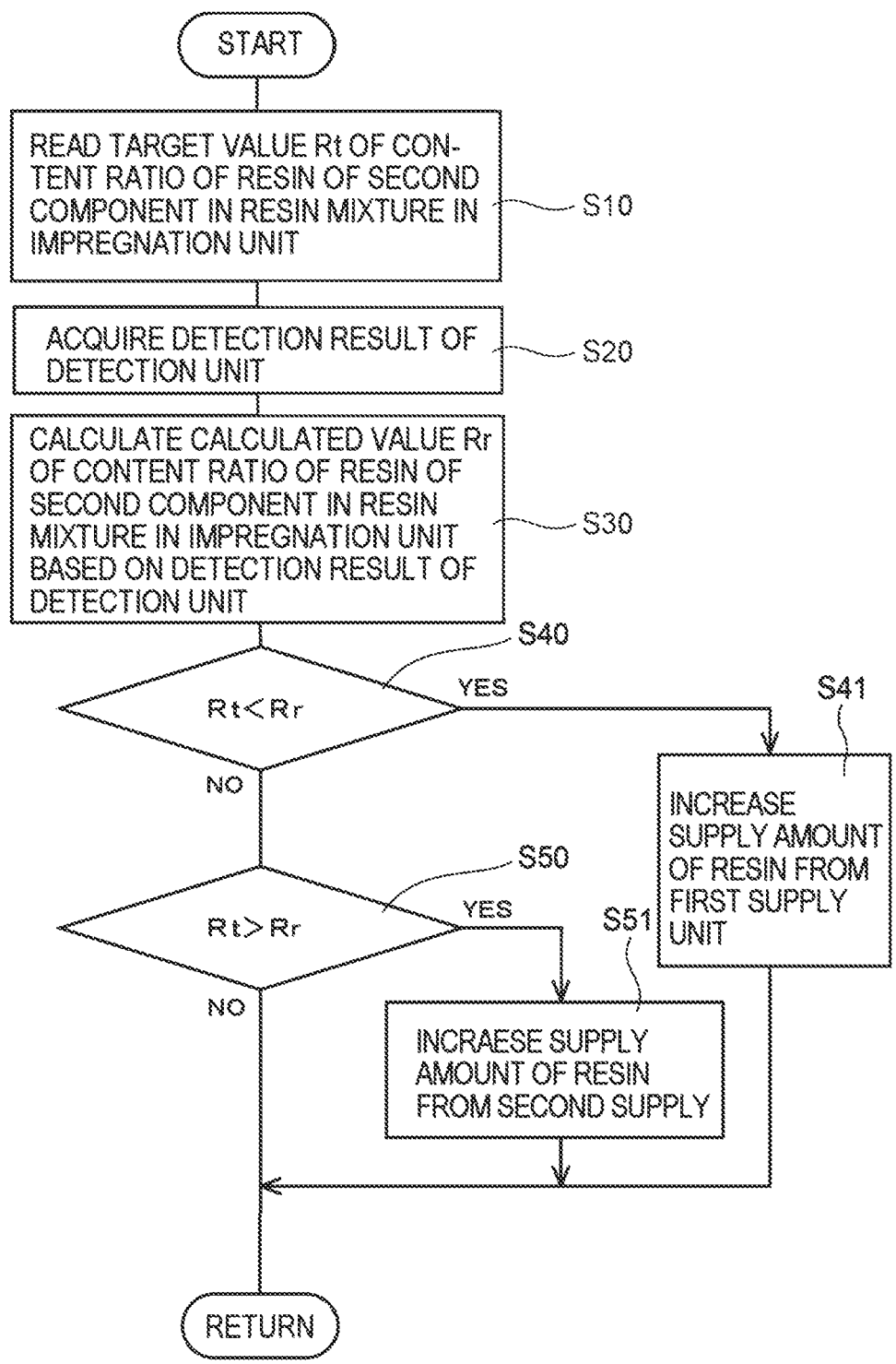
FIG. 4 is a control flow chart of a screw controller in the second exemplary embodiment.
Figure 5:
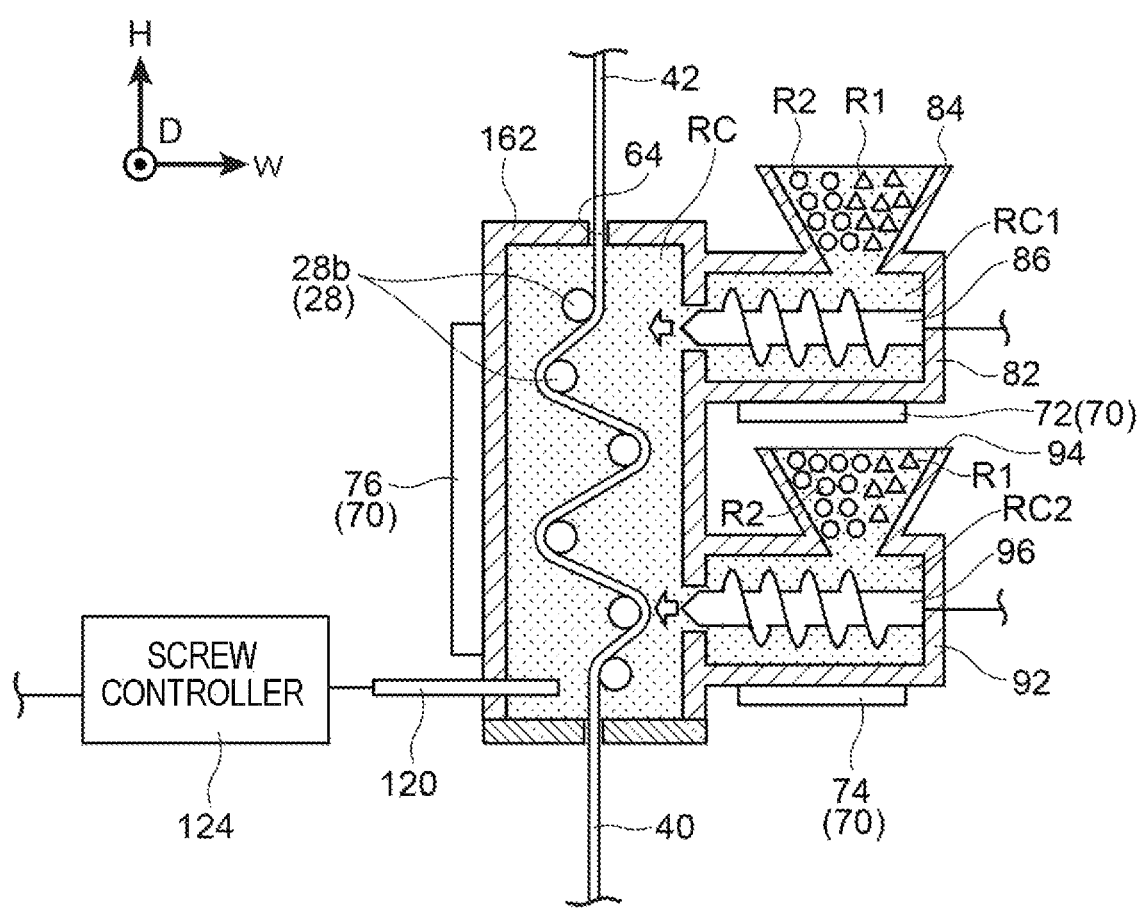
FIG. 5 is a schematic configuration diagram illustrating a modification of the shaping apparatus according to the second exemplary embodiment.

Next, an example of the impregnation device and the shaping apparatus according to the second exemplary embodiment of the present disclosure will be described based on FIGS. 3 to 5. Regarding the second exemplary embodiment, different points from the first exemplary embodiment will be mainly described.

(Configuration)

Figure 3:
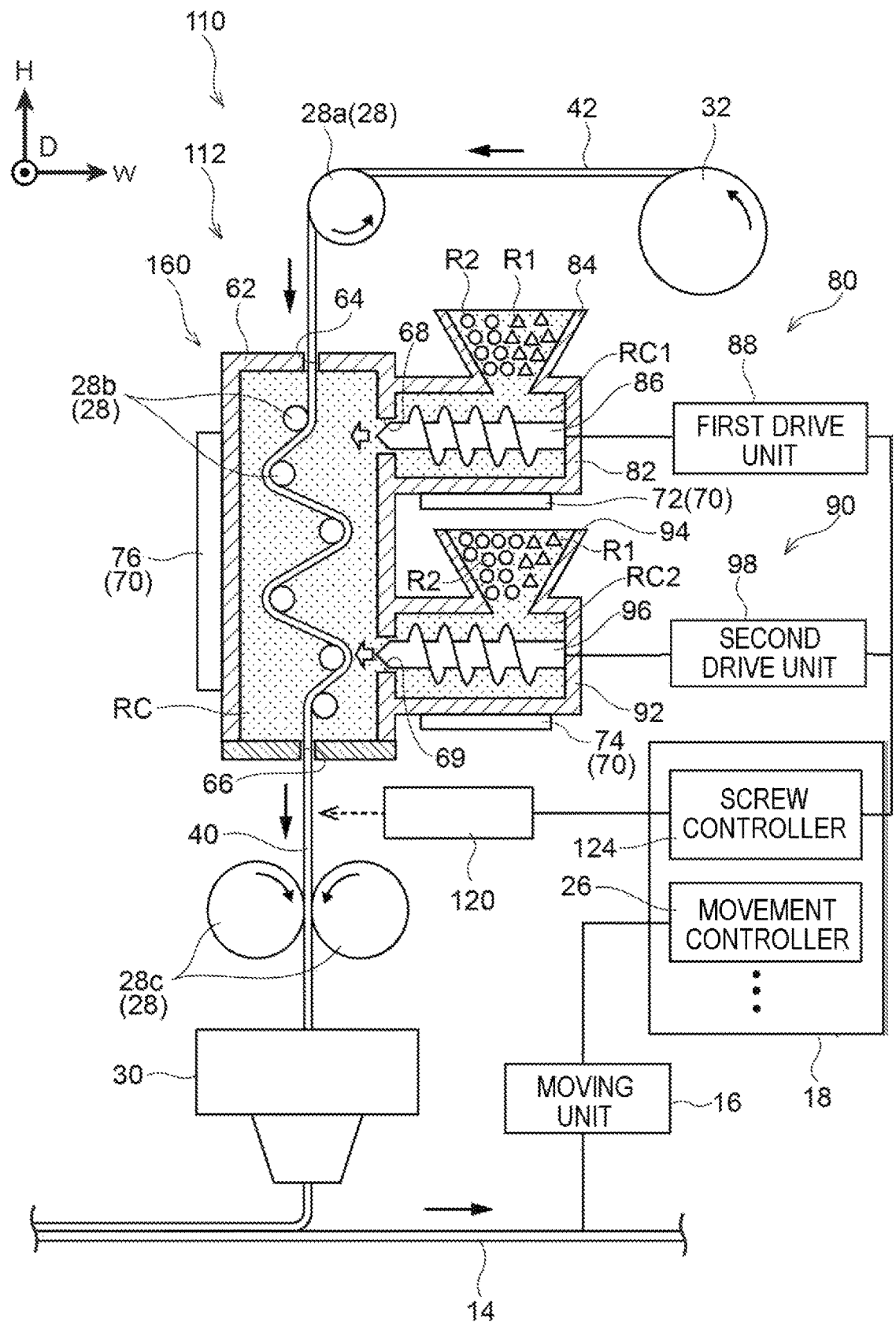
FIG. 3 is a schematic configuration diagram illustrating a shaping apparatus according to a second exemplary embodiment.

The shaping apparatus 110 according to the second exemplary embodiment includes an impregnation device 160 instead of the impregnation device 60, as illustrated in FIG. 3. The impregnation device 160 includes a screw controller 124 having a different configuration from the screw controller 24 instead of the screw controller 24 according to the first exemplary embodiment. The screw controller 124 is an example of a supply controller. Further, the impregnation device 160 further includes an optical sensor 120.

(Optical Sensor)

The optical sensor 120 is arranged between the delivery port 66 of the impregnation device 160 and the transport roller pair 28c. The optical sensor 120 detects information about the composition of the resin contained in the filament 40 transported from the impregnation device 160, for example, by a spectroscopic analysis method. Further, the optical sensor 120 is electrically connected to the screw controller 124, and transmits the detection result of information regarding the composition of the resin contained in the filament 40 to the screw controller 124. The optical sensor 120 is not limited to the configuration that the information about the composition of the resin contained in the filament 40 transported from the delivery port 66 of the impregnation device 160 is detected. For example, as illustrated in FIG. 5, the optical sensor 120 may be configured to be inserted into the impregnation unit 162 of the impregnation device 160 to detect information regarding the composition of the resin mixture RC in the impregnation unit 162. The optical sensor 120 is an example of a detector.

(Screw Controller 124)

The screw controller 124 has a configuration that the amount of resin supplied from the first supply unit 80 and the second supply unit 90 to the impregnation unit 162 is controlled based on the detection result of the optical sensor 120. A control flow of the supply amount of the resin by the screw controller 124 will be described with reference to the flow chart illustrated in FIG. 4.

First, in step S10, the screw controller 124 reads a target value Rt of the content rate of the resin R2 of the second component in the resin mixture RC within the impregnation unit 162, and proceeds to step S20. The target value Rt of the content rate of the resin R2 of the second component is input to the controller 18 through an operation panel by, for example, the user of the shaping apparatus 110. Further, the target value Rt of the content rate of the resin R2 of the second component may be obtained from, for example, a three-dimensional object shaped by the shaping apparatus 110.

Next, in step S20, the screw controller 124 acquires the detection result detected by the optical sensor 120, and proceeds to step S30.

Next, in step S30, the screw controller 124 calculates the calculated value Rr of the content rate of the resin R2 of the second component in the resin mixture RC within the impregnation unit 162 based on the detection result acquired in step S20, and then, the process proceeds to step S40.

Next, in step S40, the screw controller 124 determines whether the calculated value Rr of the content rate of the resin R2 of the second component is larger than the target value Rt. When it is determined that the calculated value Rr of the content rate of the resin R2 of the second component is larger than the target value Rt, the screw controller 124 proceeds to step S41. Meanwhile, when it is determined that the calculated value Rr of the content rate of the second component resin R2 is not larger than the target value Rt, the screw controller 124 proceeds to step S50.

When the process proceeds to step S41, that is, when Rt<Rr, the screw controller 124 controls, for example, the first drive unit 88 to increase the supply amount of the resin RC1 of the first composition supplied from the first supply unit 80 to the impregnation unit 162 by ΔP. At this time, the total supply amount of the amount of resin supplied from the first supply unit 80 to the impregnation unit 62 and the amount of resin supplied from the second supply unit 90 to the impregnation unit 62 does not change before and after step S41. That is, when the process proceeds to step S41, the screw controller 124 controls the second drive unit 98 to reduce the supply amount of the resin RC2 of the second composition supplied from the second supply unit 90 to the impregnation unit 162 by ΔP.

In the meantime, when the process proceeds to step S50, the screw controller 124 determines whether the calculated value Rr of the content rate of the resin R2 of the second component is smaller than the target value Rt. When it is determined that the calculated value Rr of the content rate of the resin R2 of the second component is smaller than the target value Rt, the screw controller 124 proceeds to step S51. Meanwhile, when it is determined that the calculated value Rr of the content rate of the resin R2 of the second component is neither larger nor smaller than the target value Rt, that is, when Rr=Rt, the screw controller 124 proceeds to step S10 again.

When the process proceeds to step S51, that is, when Rt>Rr, the screw controller 124 controls, for example, the second drive unit 98 to increase the supply amount of the resin RC2 of the second composition supplied from the second supply unit 90 to the impregnation unit 162 by ΔP. At this time, the total supply amount of the amount of resin supplied from the first supply unit 80 to the impregnation unit 62 and the amount of resin supplied from the second supply unit 90 to the impregnation unit 62 does not change before and after step S41. That is, when the process proceeds to step S51, the screw controller 124 controls the first drive unit 88 to reduce the supply amount of the resin RC1 of the first composition supplied from the first supply unit 80 to the impregnation unit 162 by ΔP.

As described above, the impregnation device 160 controls the amount of resin supplied to the impregnation unit 162 by the screw controller 124 so that the content rate of the resin R2 of the second component in the resin mixture RC within the impregnation unit 162 becomes the target value Rt.

Except for the above points, the second exemplary embodiment has the same configuration as the first exemplary embodiment.

(Operation/Effect)

Next, the operation of the second exemplary embodiment will be described. In this description, when describing a comparative embodiment with respect to the second exemplary embodiment, and when the same parts as the shaping apparatus 110 of the second exemplary embodiment are used, the reference numerals and names of the parts are used as they are.

The impregnation device 160 of the second exemplary embodiment includes a screw controller 124 instead of the screw controller 24 according to the first exemplary embodiment. That is, the impregnation device 160 includes the screw controller 124 that controls the amount of resin supplied from the first supply unit 80 and the second supply unit 90 to the impregnation unit 162 based on the detection result of the optical sensor 120 (a ninth configuration). Therefore, the impregnation device 160 having the ninth configuration may adjust the resin composition of the resin mixture RC in the impregnation unit 160 at a higher accuracy than that of the configuration in which the amount of resin supplied to the impregnation unit 160 is controlled based on a predetermined control table.

Further, the operation of the impregnation device 160 is the same as the operation of the first exemplary embodiment, except for the operation that occurs by providing the screw controller 124 instead of the screw controller 24 described above.

As described above, the specific exemplary embodiments of the present disclosure have been described in detail, but the present disclosure is not limited to the above exemplary embodiments. Various modifications and changes may be made within the scope of the technical idea of the present disclosure.

For example, in the first exemplary embodiment, the resin RC1 of the first composition accommodated in the first supply unit 80 and the resin RC2 of the second composition accommodated in the second supply unit 90 are both assumed to contain the resin R1 of the first component and the resin R2 of the second component. However, the first supply unit 80 may accommodate only the resin R1 of the first component and the second supply unit 90 may accommodate only the resin R2 of the second component.

Further, in the first exemplary embodiment, the resin RC2 of the second composition is assumed to have a higher content rate of the resin R1 of the second component than the resin RC1 of the first composition. However, the resin RC2 of the second composition may have a lower content of the resin R1 of the second component than the resin RC1 of the first composition.

Further, in the first exemplary embodiment, the first supply unit 80 and the second supply unit 90 are assumed to supply the resin to the impregnation unit 62 at different positions in the transport direction of the fiber bundle 42. However, the first supply unit 80 and the second supply unit 90 may be configured to supply the resin to the impregnation unit 62 at the same position in the transport direction of the fiber bundle 42.

Although not particularly described in the above exemplary embodiments, the filament 40 impregnated with the resin by the impregnation device 60 may be stored and used for different purposes, or after the filament 40 is stored, the filament 40 may be transported to the ejection unit 30 of a shaping apparatus that does not include the impregnation device 60 to shape a three-dimensional object.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An impregnation device comprising:
   an impregnation unit that impregnates a bundle of transported continuous fibers with a resin mixture, the impregnation unit comprising a container extending in a transport direction of the continuous fibers, the container including
      a pair of end walls that intersect with the transport direction,
      a side wall that extends in the transport direction and between the pair of end walls,
      a first supply port in the side wall permitting supply of a first composition comprised of a first resin into the container, and
      a second supply port in the side wall, downstream from the first supply port in the transport direction, permitting supply of a second composition comprised of a second resin into the container, wherein the second resin is different from the first resin;
   a first supply unit configured to supply the first composition to the impregnation unit via the first supply port;
   a second supply unit configured to supply the second composition to the impregnation unit via the second supply port; and
   a supply controller that controls an amount of the first resin supplied from the first supply unit to the impregnation unit and an amount of the second resin supplied from the second supply unit to the impregnation unit.

2. The impregnation device according to claim 1, wherein the resin of the first composition contains a resin of a first component and a resin of a second component, and the resin of the second composition contains at least the resin of the second component.

3. The impregnation device according to claim 2, wherein the first supply unit comprises a first body and a first supply screw in the first body,
   the second supply unit comprises a second body and a second supply screw in the second body,
   the continuous fibers have a surface including polar groups,
   the resin of the second component contains a high-affinity resin having a higher affinity for adhesion to the polar groups than the resin of the first component, and
   the resin of the second composition has a higher content of the resin of the second component than the resin of the first composition.

4. The impregnation device according to claim 2, wherein the resin of the second composition contains the resin of the first component and the resin of the second component, and
   the resin of the first composition and the resin of the second composition have different mixing ratios between the resin of the first component and the resin of the second component.

5. The impregnation device according to claim 2, wherein the first supply unit comprises a first body and a first supply screw in the first body,
   the second supply unit comprises a second body and a second supply screw in the second body,
   the continuous fibers have a surface including polar groups,
   the resin of the second component contains
   a high-affinity resin having a higher affinity for adhesion to the polar groups than the resin of the first component, and
   the second composition further comprises a compatibilizer for compatibilizing the resin of the first component and the high-affinity resin.

6. The impregnation device according to claim 1, wherein the supply controller controls the amount of resin supplied from the first supply unit and the second supply unit to the impregnation unit based on a predetermined control table.

7. The impregnation device according to claim 1, further comprising:
   a sensor that detects information on a composition of the resin in the impregnation unit or a composition of the resin impregnated in the bundle of continuous fibers, wherein
   the supply controller controls the amount of resin supplied from the first supply unit or the second supply unit to the impregnation unit based on a detection result of the sensor.

8. An impregnation device comprising:
   an impregnation unit that impregnates a bundle of transported continuous fibers with a resin mixture, the impregnation unit comprising a container extending in a transport direction of the continuous fibers, the container including
      a pair of end walls that intersect with the transport direction,
      a side wall that extends in the transport direction and between the pair of end walls,
      a first supply port in the side wall configured to supply a resin into the container, and
      a second supply port in the side wall, downstream from the first supply port in the transport direction, configured to supply the resin into the container;
   a first variable supply unit configured to supply the resin to the impregnation unit via the first supply port and capable of controllably varying an amount of the resin supplied from the first supply unit to the impregnation unit; and
   a second variable supply unit configured to supply the resin to the impregnation unit via the second supply port and capable of controllably varying an amount of the resin supplied from the second variable supply unit to the impregnation unit.

9. A shaping apparatus comprising:
   the impregnation device according to claim 1; and
   a shaping unit that shapes a three-dimensional object using filaments formed by impregnating the bundle of continuous fibers with a resin mixture by the impregnation device.

10. A shaping apparatus comprising:

the impregnation device according to claim 2; and a shaping unit that shapes a three-dimensional object using filaments formed by impregnating the bundle of continuous fibers with a resin mixture by the impregnation device.

11. A shaping apparatus comprising:

the impregnation device according to claim 3; and a shaping unit that shapes a three-dimensional object using filaments formed by impregnating the bundle of continuous fibers with a resin mixture by the impregnation device.

12. A shaping apparatus comprising:

the impregnation device according to claim 4; and a shaping unit that shapes a three-dimensional object using filaments formed by impregnating the bundle of continuous fibers with a resin mixture by the impregnation device.

13. A shaping apparatus comprising:

the impregnation device according to claim 5; and a shaping unit that shapes a three-dimensional object using filaments formed by impregnating the bundle of continuous fibers with a resin mixture by the impregnation device.

14. A shaping apparatus comprising:

the impregnation device according to claim 6; and a shaping unit that shapes a three-dimensional object using filaments formed by impregnating the bundle of continuous fibers with a resin mixture by the impregnation device.

15. A shaping apparatus comprising:

the impregnation device according to claim 7; and a shaping unit that shapes a three-dimensional object using filaments formed by impregnating the bundle of continuous fibers with a resin mixture by the impregnation device.

16. A shaping apparatus comprising:

the impregnation device according to claim 8; and a shaping unit that shapes a three-dimensional object using filaments formed by impregnating the bundle of continuous fibers with a resin mixture by the impregnation device.

17. An impregnation device comprising:

impregnation means for impregnating a bundle of transported continuous fibers with a resin mixture, the impregnation unit comprising a container extending in a transport direction of the continuous fibers, the container including a pair of end walls that intersect with the transport direction and a side wall that extends in the transport direction and between the pair of end walls;

first supply means for supplying a first composition comprised of a first resin to the impregnation means, the first supply means including a first supply port in the side wall and configured to supply the first composition to the bundle of transported continuous fibers;

second supply means for supplying a second composition comprised of a second resin that is different from the first resin to the impregnation means, the second supply means including a second supply port in the side wall and configured to supply the second composition to the bundle of transported continuous fibers, wherein the second supply port is located downstream from the first supply port in a transport direction of the bundle of transported continuous fibers; and supply control means for controlling an amount of the first resin supplied from the first supply means to the impregnation means and an amount of the second resin supplied from the second supply means to the impregnation means.

18. The impregnation device according to claim 1, wherein one of the pair of end walls includes therein a receiving opening and the other of the pair of end walls includes therein a delivery opening, the receiving opening and the delivery opening permitting passage of the continuous fibers through the container in the transport direction.

\* \* \* \* \*